Dec. 30, 1969     G. R. HUNT     3,487,215
METHOD OF ENHANCING SMALL THERMAL DIFFERENCES
IN THE PRESENCE OF LARGE THERMAL GRADIENTS
Filed Feb. 26, 1968     4 Sheets—Sheet 1
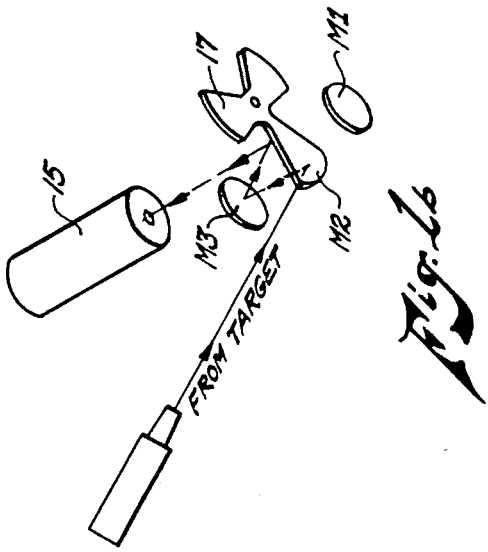
Fig. 1a
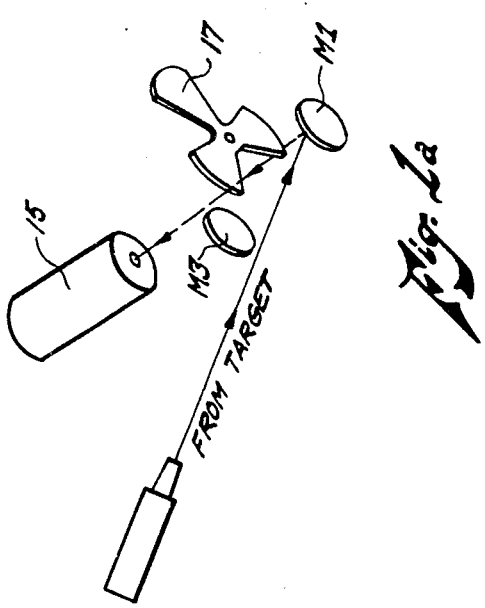
Fig. 1b
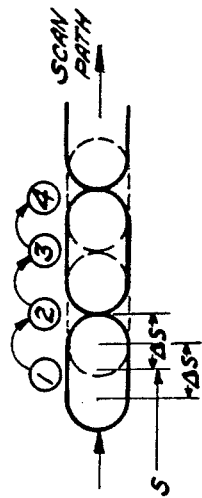
Fig. A PRIOR ART
MODE 1
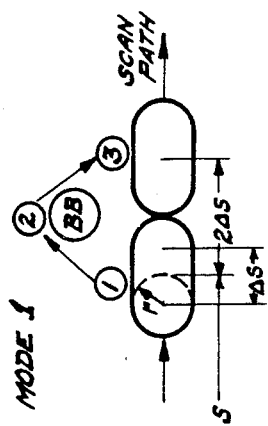
Fig. 5
MODE 2
INVENTOR.
GRAHAM R. HUNT
BY Harry A. Herbert Jr.
Orsen Tashjian
ATTORNEYS

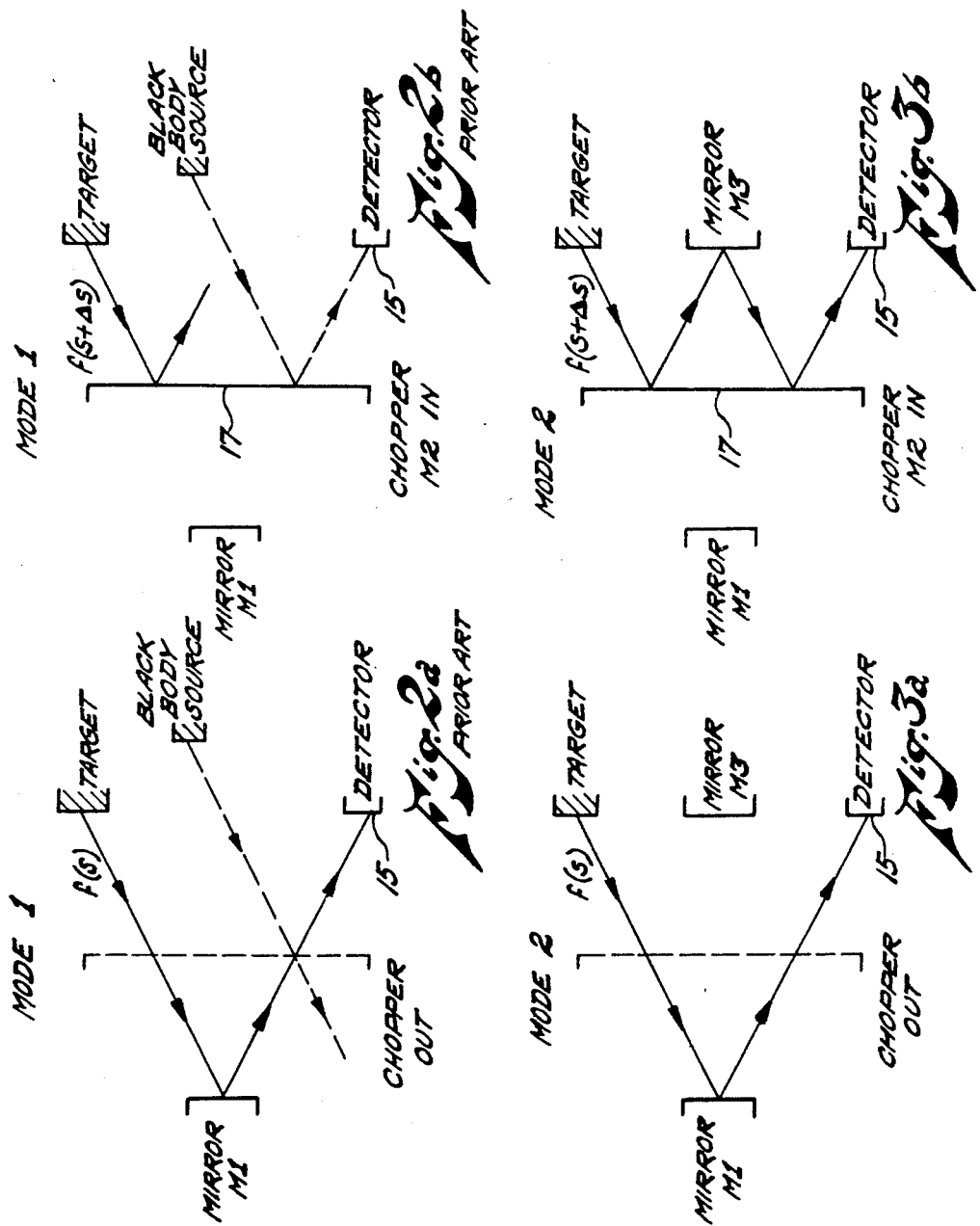

United States Patent Office 3,487,215
Patented Dec. 30, 1969

3,487,215
METHOD OF ENHANCING SMALL THERMAL DIFFERENCES IN THE PRESENCE OF LARGE THERMAL GRADIENTS
Graham R. Hunt, Winchester, Mass., assignor to the United States of America as represented by the Secretary of the Air Force
Filed Feb. 26, 1968, Ser. No. 708,055
Int. Cl. G01t 1/16; H01j 31/49
U.S. Cl. 250—83.3    4 Claims

ABSTRACT OF THE DISCLOSURE

A system for enhancing the fine detail in an infrared image by scanning a raster with a mirror-chopper fed detector over the target area and referencing one sampled area against the next, the intensity from which is reduced by a constant factor. The detector output is then a difference curve related to a derivative trace of the radiance profile, superimposed on the true radiance profile reduced in intensity.

Background of the invention

This invention relates to a system for enhancing fine detail in the production of radiance pictures of targets in which large differences also occur and, more particularly, the invention is concerned with providing a method and apparatus for infrared image enhancement where the dynamic range of picture viewing is limited.

When the wavelength range of interest lies outside that available for use with conventional photographic techniques, radiance pictures of an area may be built up as a raster of individual radiance intensity traces, called radiance profiles, across the given area. These radiance profiles may be produced by scanning individual lines with an appropriate detector.

A common limitation to detecting small radiance changes in an area where large radiance differences exist is the dynamic range of the picture viewing system. This problem is particularly severe when the processed detector output is displayed photographically so that the dynamic range is limited to the black-white visual range of the observer. While small variations may be individually investigated in detail by adjustment of the amplification of the signal with the detection system, such adjustment results in off-scale signals where large radiance variations occur. Thus, while a particular small radiance difference may be studied in detail in this manner, the remainder of the picture often includes large areas of complete blackness or whiteness. As a result, initial exploratory procedures to locate areas where fine detail in radiance picture may exist present a problem in observational work where time limitations are imposed by local weather conditions and the availability of the target area.

When an opaque surface is subjected to a radiant source, the radiation leaving that surface may be expressed as the sum of the directional reflected incident radiation and the directional emitted radiation from the heated surface. If the radiance leaving a surface heated to about 400° K. (as is the case with the lunar surface heated by the sun) is measured in a limited wavelength range in the mid infrared region, for instance from 8–14μ, the radiance is almost entirely due to emission from the heated surface. The amount of surface heating depends primarily upon such factors as the orientation of the surface relative to the incident flux, the thermal conductivity, the specific heat, the emissivity and the density of the surface material. Because of this, small differences in the detected radiance can be caused by the presence of small topographical features on the surface, differences in composition, or differences in the state of aggregation of the surface materials. Large differences in radiance are usually caused by the gross over-all geometry of the surface, or by large topographical features, particularly if they cause areas of shadow to be present on the target.

Summary of the invention

This invention is concerned with providing a technique by which fine detail produced by small radiance changes can be enhanced and so rendered easily detectable while at the same time the larger over-all radiance differences are retained in reduced form.

Accordingly, it is an object of the invention to provide an infrared scanning system whereby the fine detail in a radiance picture is enhanced by scanning a raster with a mirror-chopper fed detector over the target.

Another object of the invention is to provide an infrared image enhancing system which is particularly effective for use in producing an improved radiance profile of a target wherein small radiance changes exist in an area of larger radiance differences.

Still another object of the invention is to provide a method and apparatus for producing a radiance profile of a target by referencing one sampled area of the target against the next, the radiance intensity of which is reduced by a constant factor.

A further object of the invention is to provide an infrared image enhancement system wherein a detector produces an output which is a difference curve related to a derivative trace of the radiance profile superimposed on the true radiance profile reduced in intensity.

A still further object of the invention is to provide an image enhancement system wherein the fine detail in a radiance picture can be determined quickly enough to complete exploratory procedures before local weather conditions and target availability prevent effective continuation of the observational work.

These and other objects, features and advantages will become more apparent after considering the description that follows and from the drawings wherein like numbers are used throughout to identify like elements.

Description of the drawings

In the drawings:
FIGURE 1a is a system optical diagram according to the invention showing the radiation path from the target with the chopper out;
FIGURE 1b is the system of FIGURE 1a with the chopper in showing the radiation reflecting from the chopper and mirror M3;
FIGURE 2a illustrates the optical arrangement in the region of the chopper in mode 1 with chopper out and radiation passing directly from the mirror M1 to the detector;
FIGURE 2b is the illustration of FIGURE 2 with chopper in showing the radiation from a reference blackbody source reflected to the detector;
FIGURE 3a illustrates the optical arrangement in mode 2 according to the present invention showing chopper out with detector receiving full radiation from target;
FIGURE 3b illustrates mode 2 arrangement with chopper in with detector receiving radiation after being attenuated by mirror M3 and partially superimposed on earlier adjacent full strength signal from target;
FIGURE 4 is a diagram showing the method of target radiance sampling in mode 1 wherein the total sampled area is referenced against the emission from a blackbody included in the sampling device as showing in FIGURES 2a and 2b;
FIGURE 5 is a diagram of the mode 2 operation shown in FIGURES 3a and 3b wherein the target area is referenced against an adjacent area on the target removed Δs from the original area. The order of sampling is indicated by the numbers and arrows above the illustrated sampled areas;

Preferred embodiment of the invention

Figure 6A:
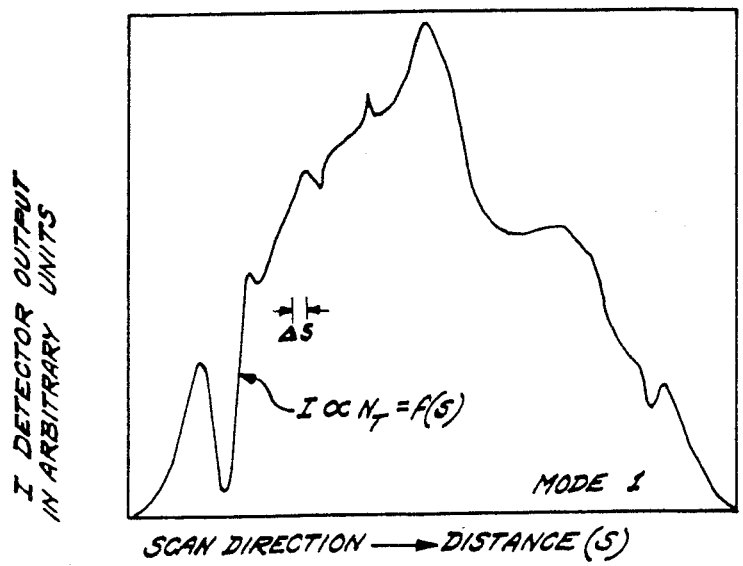
FIGURE 6a is a plot of the detector output as a function of the distance s along a target surface obtained by referencing the target radiance at each point against a constant black-body source (mode 1)

Pictures of infrared radiance suitable for visual inspection may be produced by converting the output of a scanning infrared detector to an electrical current which flows through a synchronized scanning light source focused on a photographic film. The system used in the present invention operates in this manner and includes a modified X–Y scanning infrared camera which is a modularized AC radiometric device which scans in the image plane, measures the energy level, and displays these measurements as a thermogram on Polaroid film.

Referring now to FIGURES 1a and 1b, which are optical diagrams according to the invention showing the two radiation paths of the target energy. The radiometer system always compares levels of energy received through two optical paths or channels. One path can be designated the target path where the energy from the target travels directly to the mirror M1 from which it is reflected to the detector 15. This arrangement is shown in FIGURE 1a. In FIGURE 1b a second path or channel is created when a mirror-chopper 17 is alternately inserted in the target energy path. In the second channel arrangement, that is, when the chopper 17 is positioned in the target path, the target energy is reflected therefrom to a mirror M3 from which it is reflected back to the chopper 17 and then to the detector 15. This system, in effect, produces two images having different energy levels because of the different optical paths which the energy travels prior to reaching the detector 15.

The instrument operates on the principle of heat transfer between different thermal energy levels. These levels are supplied by means of a mirrored radiation chopper 17 that alternately directs energy from two radiance sources onto the detector 15. The output of the detection system is made proportional to the difference between the radiances arriving alternately and sequentially in the two channels. Thus, $$I = K(C_2 N_{T2} - C_1 N_{T1}) + C \qquad (1)$$

where $I$ is the detector output, which is displayed on photographic film, $K$ and $C$ are adjustable instrument functions, $C_1$ and $C_2$ are factors accounting for reflection losses in each of the two channels, and $N_{T1}$ and $N_{T2}$ are the radiances of two targets or sample areas integrated over a specified wavelength interval.

The radiance picture is built up as a raster of radiance profile traces along straight lines on a given surface. The radiance at any position along a straight line on the surface studied may be expressed as $$N_T = f(s) \qquad (2)$$

where $N_T$ is the radiance of a given sample area, and $S$ is the position of the center of the instantaneously sampled area along the straight line, or raster line on the surface, and is, of course, a function of sample area size.

Referring back to the conventional method, each of the radiance profiles along a single trace, of which the thermogram is constructed, are obtained by referencing the radiance of the target against the emission from a black-body $N_{bb}$ (see FIGURES 2a and 2b) and the output from the detection system $I$, for each sampled spot along the scan trace is given by $$I = K[\rho_{M2} N_{bb} - \rho_{M1} f(s)] + C \qquad (3)$$
$$= D - K \rho_{M1} f(s) \qquad (3a)$$

where $D = C + K \rho_{M2} N_{bb}$ = constant, and where $\rho M1$ and $\rho M2$ are the reflectances of mirrors M1 and M2 chopper 17. The number of individual spots sampled along each trace of given length is determined by the scan speed.

The optical arragement in the region of the mirrored chopper, which shall be referred to as mode 1, is shown in FIGURE 2. FIGURE 2a shows that target emission falls on the detector 15 when the chopper 17 is in the out position, while FIGURE 2b shows that the black-body emission falls on the detector 17 when the chopper 15 is in the in position. Because the instrument is operating while scanning across a surface, consecutive signals arriving at the detector when the chopper is in the out position arrive from areas on the surface separated by 2Δs.

The enhancement procedure according to the invention is effected by making a modification to this arrangement by placing a mirror in a position close to that formerly occupied by the black-body. With this new arrangement, referred to as mode 2 (see FIGURE 3), the emission $N_{T1}$ from a given area of the target is referenced against the emission from a target area removed $S$ from the first position, and $N_{T2}$, the emission from this second area is given by $$N_{T2} = f(s + \Delta s) \qquad (4)$$

and $$I = K[\rho_{M2}^2 \rho_{M3}) f(s + \Delta s) - \rho_{M1} f(s)] + C \qquad (5)$$

where $\rho M2$ and $\rho M3$ are the reflectances of the chopper and mirror $M_3$, respectively.

This optical arrangement is illustrated in FIGURE 3, where 3a and 3b show the optical paths of the target emission for the out and in position of the chopper. If the reflectivities of the mirrors are arranged such that $\rho M1 = \rho M2^2 \rho M3$, the trace obtained for an infinitely slow scan [where $\Delta s \to 0$, so $f(s+\Delta s) \to f(s)$] across an area where even a large radiance difference occurs will result in a uniformly dark line on the film, because in this case $$(\rho_{M2}^2 \rho_{M3}) f(s + \Delta s) - \rho_{M1} f(s) = 0 \qquad (6)$$

and so $$I = C \qquad (7)$$

If, however, the reflectivity of mirror M1 is reduced to some factor $k$ of the reflectivity of $M2 + M3$ so that $$k \rho_{M1} = (2 \rho_{M2} + \rho_{M3})$$

then, again for an infinitely slow scan, i.e., $\Delta S \to 0$, $$I = K[(\rho_{M1}(1-k)) f(s)] + C' \qquad (8)$$

It can be seen that if the instrument is adjusted such that $C' = D = (C - K \rho_{M2} N_{bb})$ and a trace is obtained over the same region for the two modes of operation, that obtained in mode 2 will have exactly the same profile as for mode 1, except that the intensity will be reduced by a constant factor $(1-k)$. Thus, by selecting mirrors with appropriate reflective properties for mode 2, a trace can be produced which proportionately decreases the intensity of the profile by any specified amount.

In the case of a finite scan rate, Δs is not zero, or even necessarily small. For this situation, $$I = K\{_{\rho M1}[f(s+s) - kf(s)]\} + C \quad (9)$$

It is necessary to consider more in detail exactly what is being sampled. If the field of view on the sampled surface is a circle of radius $r$, and the distance traveled by the center of this circle is $\Delta s$ in either sampling channel, the size of the total area sampled in any one channel is $$\pi r^2 + 2r\Delta s \quad (10)$$

The sampling methods are illustrated in FIGURES 4 and 5, where, for illustrative purposes, $\Delta S$ is made equal to $r$. For mode 1 or conventional operation, shown in FIGURE 4, the detector receives energy alternately from a surface sampled area and a constant temperature blackbody. The total radiance received from each surface element is given by $$N_T \text{ (total)} f(s) = \int_{s-1/2\Delta s}^{s+1/2\Delta s} f(s) ds \quad (11)$$

For mode 2 enhanced operation shown in FIGURE 5, consecutive overlapping areas are alternately sampled. The total radiance from two such consecutive areas can be expressed as $$NT_1 \text{ (total)} = f(s) = NT \text{ (total)} \quad (12)$$

$$N_{T2} \text{ (total)} = f(s + \Delta s) = \int_{s+1/2\Delta s}^{s+3/2\Delta s} f(s + \Delta s) ds \quad (13)$$

However, these total radiances are not what is detected, because only the radiance arriving from an instantaneous spot size $\pi r^2$ reaches the detector. The radiance values are thus smeared, and the degree of smearing increases with an increase in the magnitude of $\Delta s$, and depends on the time constant and performance of the detector and detection system. It can be seen then that the spatial resolution, in terms of the size of the features detectable, is initially determined by the value of $r$, or the instantaneous sample spot size, and secondly by $\Delta s$, in an analogous manner to the way in which the resolution of a spectrum is initially determined by the slit width, and secondly by the scanning rate.

Figure 6B:
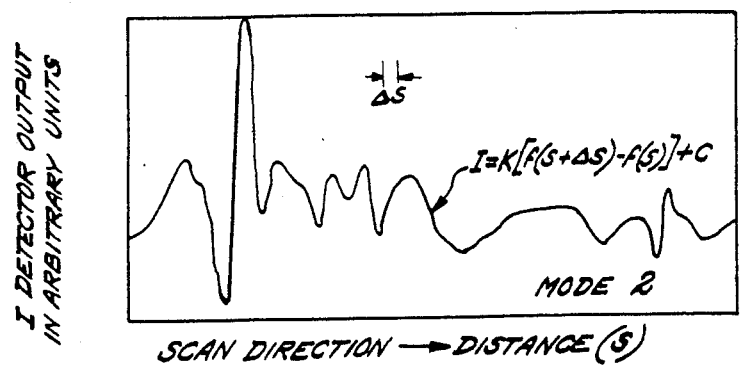
FIGURE 6b is a difference plot obtained by referencing the target radiance of a moving point on a curve against another spot on that curve removed Δs from it. The derivative of the true radiance profile is obtained by dividing this curve by Δs.
Figure 6C:
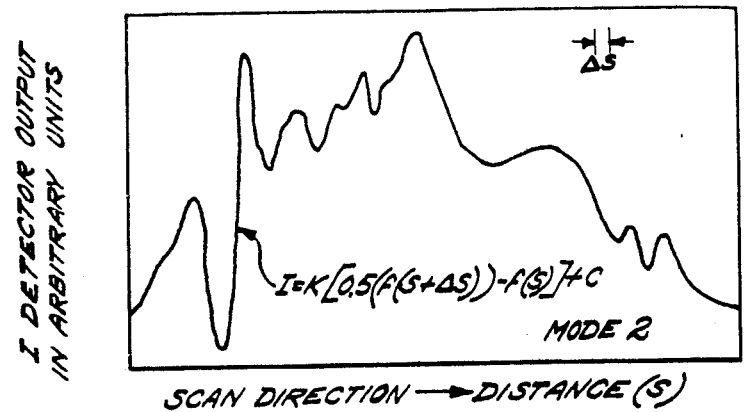
FIGURE 6c is a curve obtained in the same manner as FIGURE 6b except that the intensity of the radiance of the reference is reduced by a factor of one-half.

FIGURE 6a shows a single radiance profile of a surface produced by scanning with a defined sample size using a mode 1 operation. FIGURE 6b shows the curve produced for the case where the centers of the sampled area with the chopper open and closed are separated by the amount shown in the figure, and where $k=1$, i.e., $\rho M1 = \rho M2^2 M3$. In FIGURE 6c is shown the curve produced by chopping between a given point on the radiance profile and a point removed $\Delta s$ from it. The intensity of this second sample is reduced in intensity by 50%, i.e., $k=0.5$, with the same separation of the centers of the sample areas given in FIGURE 6b. It can be seen that the presence of small features of the profile in FIGURE 6a are greatly enhanced in FIGURE 6b, especially of the dynamic range is expanded to lie within the same limits as those for the curve in FIGURE 6a, but that no information is present indicating the form of the original profile. In FIGURE 6c, however, the enhancement of the small features are evident and over-all original profile is still retained.

In the present technique, a single 5 sec. of arc scanning beam is continuously collected from the sample and subsequently directed by a chopper via two different routes to the detector, as shown in FIGURES 3a and 3b for mode 2. As such, two consecutively sampled areas will always overlap by the instantaneous sampled spot size ($\pi r^2$), and the separation of the centers of the sampled area $\Delta s$ will be determined only by the scan rate.

Figure 7A:
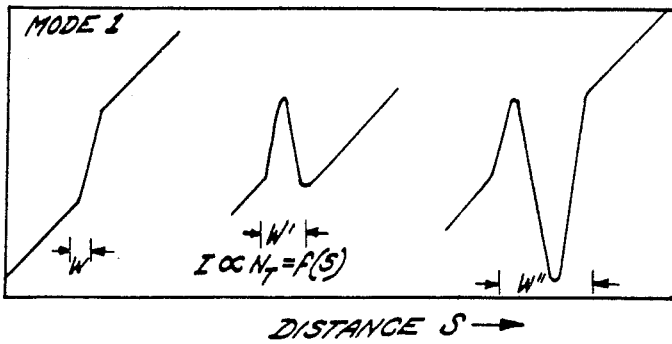
FIGURE 7a shows three selected features on a true radiance profile.
Figure 7B:
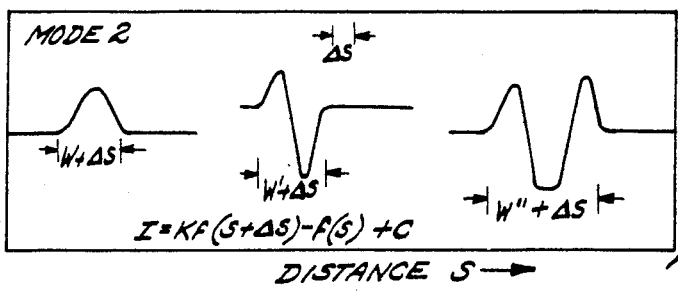
FIGURE 7b is a difference plot of the three features of FIGURE 7a produced in the same way as the curve in FIGURE 6b.
Figure 7C:
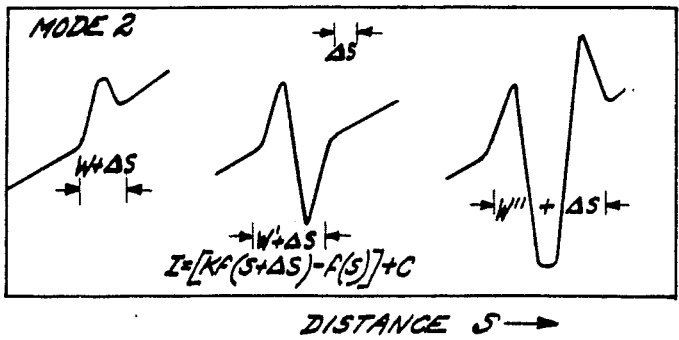
FIGURE 7c is a curve produced in the same way as the curve in FIGURE 6c which is the preferred embodiment of the invention.

In FIGURES 7a, b and c are the types of curves produced where three features in a radiance profile are considered. If the width of a feature in the radiance profile is $W$, in the present method, the feature produced in the resultant curve will be $W + \Delta s$ wide. Thus, for the case where many small features occur close together, least confusion will be caused where $\Delta s$ is minimized, because this will lead to least overlapping of different features. FIGURE 7a shows the true radiance profile obtained by referencing the target radiance at each point against a constant black-body source. FIGURE 7b is a difference plot of the features in 7a by referencing the radiance of a moving point on the curve against another spot on the curve removed $\Delta s$ from it. FIGURE 7c is a difference plot as in 7b but made according to the preferred embodiment of the invention wherein the intensity of the radiance of the reference is reduced by a factor of one-half.

Mode of operation

The hereinbefore described infrared image enhancement system provides strong evidence that certain craters on the moon having walls facing the sun before local sunset are warmer through the cooling phase thereby indicating that solar, rather than internal heat, produces the unusual result.

Infrared images of the thermal pattern of a crater are obtained with the device shown schematically in FIGURES 1a and 1b which converts the emitted infrared signal detected from each resolution element on the lunar surface into an electric current that modulates the intensity of a glow tube (not shown) focused on Polaroid film. Visible photographs are constructed by scanning with the device in the image plane of the telescope thereby achieving a TV-like raster of the scene. Images are produced by utilizing the hereinbefore described thermal enhancement technique in which the signal from each resolution element is referenced against a suppressed or attenuated signal from the adjacent partially overlapping element. Using this technique, each line in the raster corresponds to a derivative of the radiance profile superimposed on the true radiance profile suppressed in intensity. FIGURES 4 and 5 show the conventional and the new improved methods, respectively, of obtaining a radiance picture of a target.

Although the invention has been illustrated in the accompanying drawings and described in the foregoing specification in terms of preferred embodiments thereof, the invention is not limited to these embodiments or to the particular uses mentioned. Also, it should be understood that various changes, alterations, modifications and substitutions, particularly with respect to the construction details, can be made in the arrangement of the several elements without departing from the true spirit and scope of the appended claims.

Having thus described my invention, what I desire to secure by Letters Patent of the United States is:

1. A method of enhancing an infrared image of a target received by continuously scanning a telescope image comprising the steps of:
   (a) passing the radiation from one image element of the target to a first mirror surface,
   (b) reflecting the image from the first mirror surface directly to a detector to produce a radiation signal a first target element area,
   (c) rotating a chopper into the image radiation path,
   (d) receiving the radiation from a second image element on the chopper surface,
   (e) reflecting the image radiation from the chopper surface to a second mirror,
   (f) reflecting the image from the second mirror back to the chopper surface,
   (g) reflecting the image from the chopper surface to the detector to produce a radiation signal of a second target area which includes a portion of the first target area, and
   (h) rotating the chopper out of the image radiation path.

2. The method of infrared image enhancement defined in claim 1 wherein a portion of the image radiation received from the chopper is absorbed by the second mirror causing the radiance intensity of the second target area which is superimposed over a portion of the first target area signal to be reduced by a constant factor, thereby producing an enhanced image to permit the detection of small radiance changes in an area where large radiance differences exist.

3. The method of infrared image enhancement defined in claim 1 wherein consecutive signals arriving at the detector when the chopper is at the "in" and the "out" positions are from areas on the target surface separated by a distance, $\Delta s$.

4. The method of infrared image enhancement defined in claim 2 wherein the portion of the image radiation absorbed by the second mirror is equal to one-half the total image radiation.

References Cited

UNITED STATES PATENTS

| | | | |
|---|---|---|---|
| 3,366,795 | 1/1968 | Ravitsky et al. | 250—233 |
| 3,404,283 | 10/1968 | Stanfill et al. | 250—233 |

RALPH G. NILSON, Primary Examiner

MORTON J. FROME, Assistant Examiner

U.S. Cl. X.R.

250—203, 233